United States Patent

By et al.

[11] Patent Number: 5,263,319
[45] Date of Patent: Nov. 23, 1993

[54] EFFICIENT VARIABLE PITCH STATOR WITH PASSIVE CONTROL

[75] Inventors: Robert R. By, New Baltimore; John C. Forsgren; Gelsino J. Volpe, both of Sterling Heights, all of Mich.

[73] Assignee: General Motors Corporation, Detroit, Mich.

[21] Appl. No.: 947,613

[22] Filed: Sep. 21, 1992

[51] Int. Cl.$^5$ .................. F16D 33/00; F16D 33/02
[52] U.S. Cl. .......................... 60/342; 60/354; 60/356
[58] Field of Search .......... 60/332, 338, 342, 347, 60/352, 354, 355, 356

[56] References Cited

U.S. PATENT DOCUMENTS

| | | | |
|---|---|---|---|
| 2,015,300 | 7/1935 | Dell et al. | 74/293 |
| 2,389,174 | 11/1945 | Whitworth | 60/54 |
| 2,893,266 | 7/1959 | Kelley | 60/342 X |
| 2,932,940 | 4/1960 | Edsall et al. | 60/355 |
| 3,354,643 | 11/1967 | Paredes | 60/354 |
| 3,358,444 | 12/1967 | Tuck | 60/354 |
| 3,370,425 | 2/1968 | Au | 60/356 |
| 3,398,532 | 8/1968 | Egbert et al. | 60/54 |
| 3,442,152 | 5/1969 | Chana | 74/645 |
| 3,852,955 | 12/1974 | Wonn et al. | 60/356 X |
| 3,934,414 | 1/1976 | Merkle et al. | 60/342 |
| 3,986,356 | 10/1976 | Frotschner et al. | 60/342 |
| 4,180,977 | 1/1980 | Beardmore | 60/342 |
| 4,848,084 | 7/1989 | Wirtz | |

Primary Examiner—Edward K. Look
Assistant Examiner—John Ryznic
Attorney, Agent, or Firm—Kevin M. Hinman

[57] ABSTRACT

A three element fluid torque converter has a variable pitch stator. The stator blades have two principal orientations, closed and open. The blades are biased toward the closed position by a spring loaded annular piston. In the closed position, the blades block approximately 75% to 90% of the annular area between a stator core and a stator shell. An inlet angle for the stator blades is between 30 degrees and 70 degrees in the closed position. This combination reduces creep torque without any significant increase in driveline noise and vibration when the engine is idling. As engine speed and torque are increased, the blades overcome the spring bias to rotate to the open position thereby increasing the torque transmitted to effectively propel the vehicle.

12 Claims, 4 Drawing Sheets

EFFICIENT VARIABLE PITCH STATOR WITH PASSIVE CONTROL

TECHNICAL FIELD

This invention relates to a three element fluid torque converter for use between an engine and a transmission. More particularly, this invention relates to a torque converter having a variable pitch stator.

BACKGROUND OF THE INVENTION

Torque converters having variable pitch stators are desirable for reducing the tendency of the vehicle to creep when the vehicle is idling and the transmission is in a drive gear range. Reduction of creep torque offers several benefits. Fuel economy can be increased. The engine load at idle can be decreased, thereby reducing engine vibration perceived by the driver. And further, for vehicles requiring elevated idle speeds to satisfy high electrical power requirements at idle, idle speed can =increased while maintaining the same creep power.

Variable pitch stators are well known in the art of torque converter design. In most such stators, each stator blade is mounted for rotation about a blade axis passing through the blade. These blade axes typically intersect the torque converter axis.

Both active and passive means are used to provide blade rotation. Egbert et al. U.S. Pat. No. 3,398,532, issued on Aug. 27, 1968, shows an example of active rotation with the blades being rotated to one of three positions by axial motion of a fluid driven piston. C. Dell et al. U.S. Pat. No. 2,015,300, issued on Sep. 24, 1935, shows a passive system, wherein the blades rotate in response to fluid force against the blades.

The angle of the stator blades with respect to the torque converter axis changes as the blades are rotated about their respective blade axes. Generally, when the stator blades are rotated to a high inlet angle or closed position, the torque converter capacity for multiplying input torque at a given engine speed is substantially reduced. The blades are typically in the closed position when the vehicle engine is idling. This has the effect of reducing the torque transmitted to the vehicle wheels, thereby substantially reducing the tendency of the vehicle to creep.

However, the disruption of the fluid flow within the torque converter caused by the blades being in the closed position results in vibrations being generated within the torque converter. These vibrations are transmitted through the vehicle to the driver as audible noise and unpleasant vibrations. This condition typically occurs at idle. Also, variable pitch stators have been contributors to harshness of torque converter clutch engaging and disengaging.

SUMMARY OF THE INVENTION

It has been found that providing a variable pitch stator with a moderately open stator flow path when the blades are in the closed position will reduce creep torque by over 50% while inducing little of the vibrations, noise and harshness commonly associated with torque converters having variable pitch stators.

The present invention offers the advantage of creep torque reduction at idle with a minimum increase in noise over a fixed blade stator. This advantage is attained by using variable pitch stator blades with high inlet blade angles and by limiting the portion of the flow area blocked by the blades. This combination of providing the high positive inlet angle and limiting the reduction in flow area reduces the noise and harshness.

A spring load biases the blades to a closed position when the engine is at idle speed. As engine speed increases, the velocity of the fluid leaving the turbine and impinging against the stator blades increases, thus overcoming the spring load to rotate the stator blades to the open position.

As the vehicle begins to accelerate, the relative speed between the turbine and the impeller decreases, thereby shifting the direction of fluid impingement against the stator. This change in direction does not change the position of the stator blades. The blades continue to be held in the open position by the fluid.

The present invention both reduces noise and vibration at idle and reduces harshness of converter clutch engagement and disengagement.

It is an object of this invention to provide an improved torque converter having a stator with variable pitch blades, wherein the blades in a closed position provide an open area approximately 15% of the flow area of the stator, and further wherein the blades have a closed position inlet angle between 30 degrees and 70 degrees depending upon the number of stator blades, the torque converter thereby being capable of reducing creep torque at idle by approximately 50% without inducing vibrations.

It is also an object of this invention to provide a three element fluid torque converter having a bladed impeller rotatively fixed to the engine, a bladed turbine rotatively fixed to a transmission input element, and a bladed stator rotatively fixed to a stationary shaft when subjected to torque in a first direction, yet rotating freely about the shaft when subjected to torque in a second direction, this stator comprising a stator shell, a stator core, and a plurality of stator blades distributed around the torque converter axis between the core and the shell, the blades being rotatable between an open position and a closed position, the blades blocking approximately 75% to 90% of an annular area between the shell and the core when in the closed position, an inlet angle of the blades being between approximately 30 degrees and 70 degrees in the closed position, with this angle varying inversely with the number of stator blades, with the closed position inlet angle and the area blocked being sufficient to diminish a flow of fluid from the turbine to the impeller so as to reduce torque converter torque transmitting capacity in the closed position by approximately 50% of the torque transmitting capacity of the torque converter with the stator blades in the open position.

DESCRIPTION OF THE PREFERRED EMBODIMENT

Figure 1:
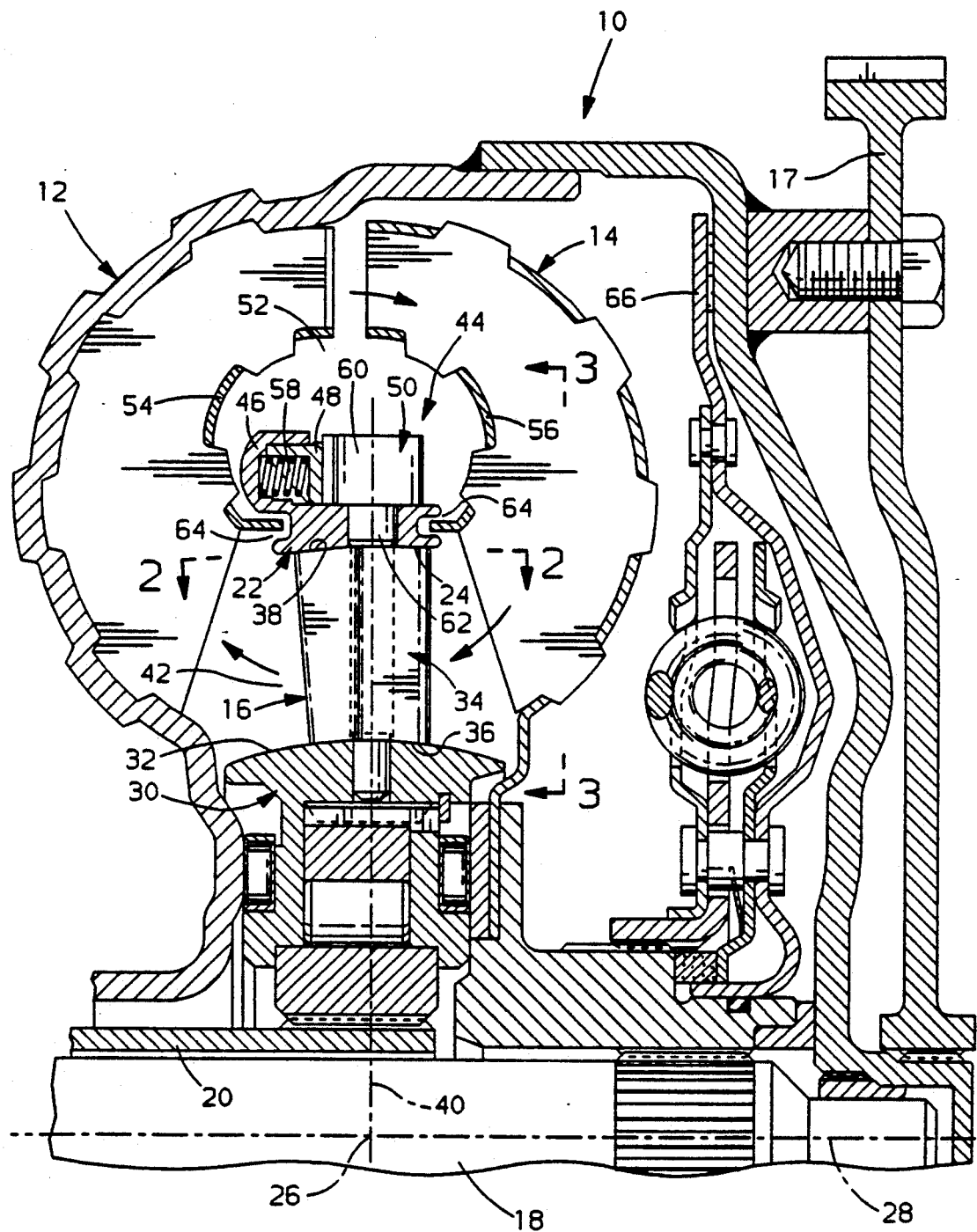
FIG. 1 shows a top half of a section of a torque converter in an open position.

A three element fluid torque converter 10 has a bladed impeller or pump 12, a bladed turbine 14 and a bladed stator 16. The impeller 12 is rotatively fixed to the engine crankshaft (not shown) through a flex plate 17 in a conventional manner. The turbine 14 is rotatively fixed to a transmission input element 18. The stator 16 is rotatively fixed to a stationary shaft 20, when subjected to torque in a first direction, but rotates freely about the stationary shaft 20, when subjected to torque in a second direction.

The stator 16 is disposed in a flow path from the turbine 14 to the impeller 12. The stator 16 has a stator core 22 with a concave spherical core surface 24 having a center 26 disposed on a torque converter axis 28. The stator 16 also has a stator shell 30 with a convex spherical shell surface 32 disposed radially inward of the core surface 24 with the center thereof being disposed in common with the center 26 of the core surface 24.

Figure 3:
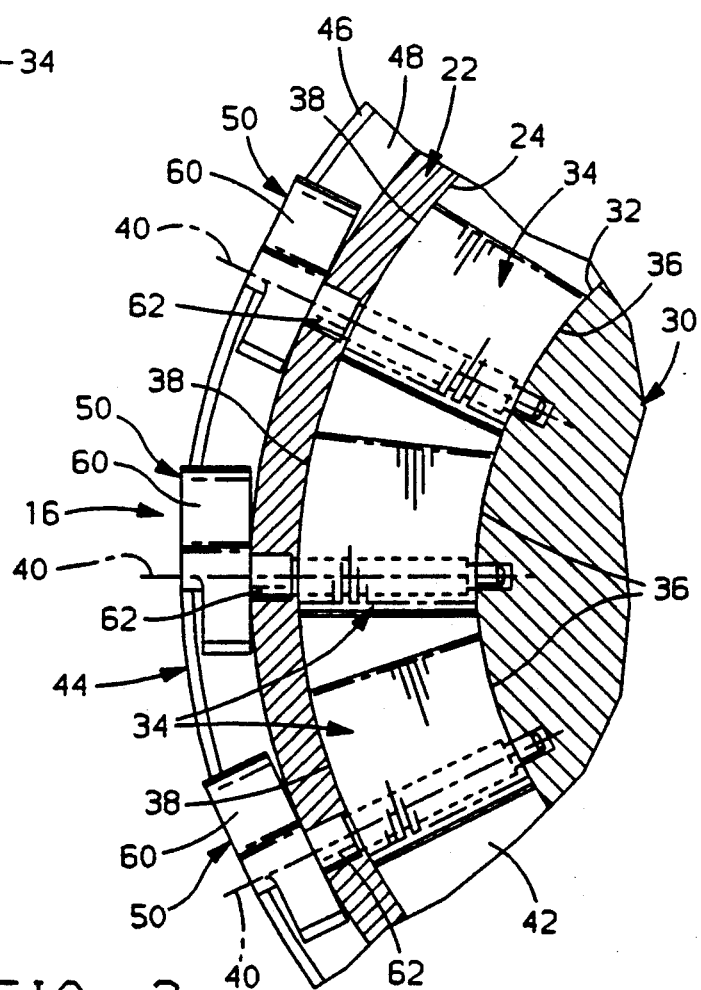
FIG. 3 shows a stator in the open position in the direction of Arrows 3 of FIG. 1.
Figure 4:
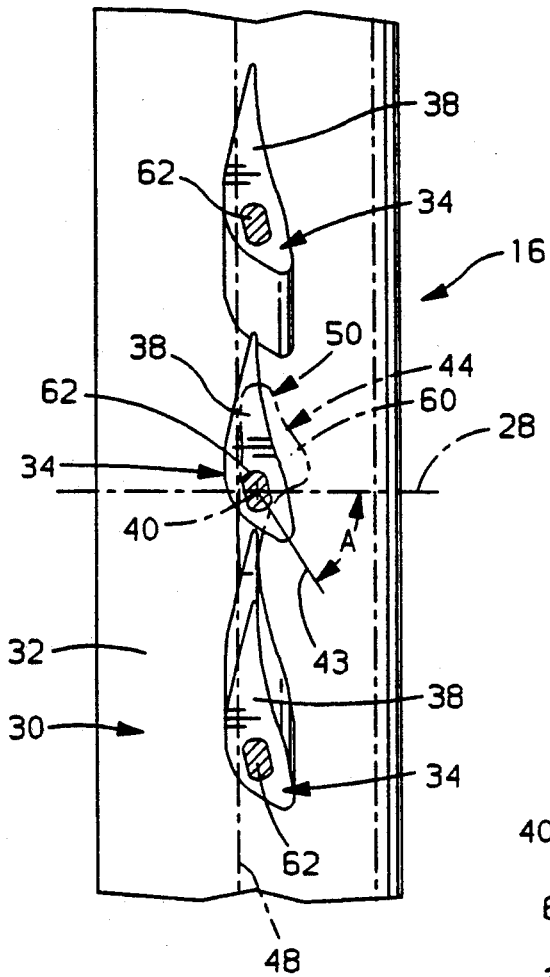
FIG. 4 shows a stator in the closed position in the direction of Arrows 2 of FIG. 1.
Figure 5:
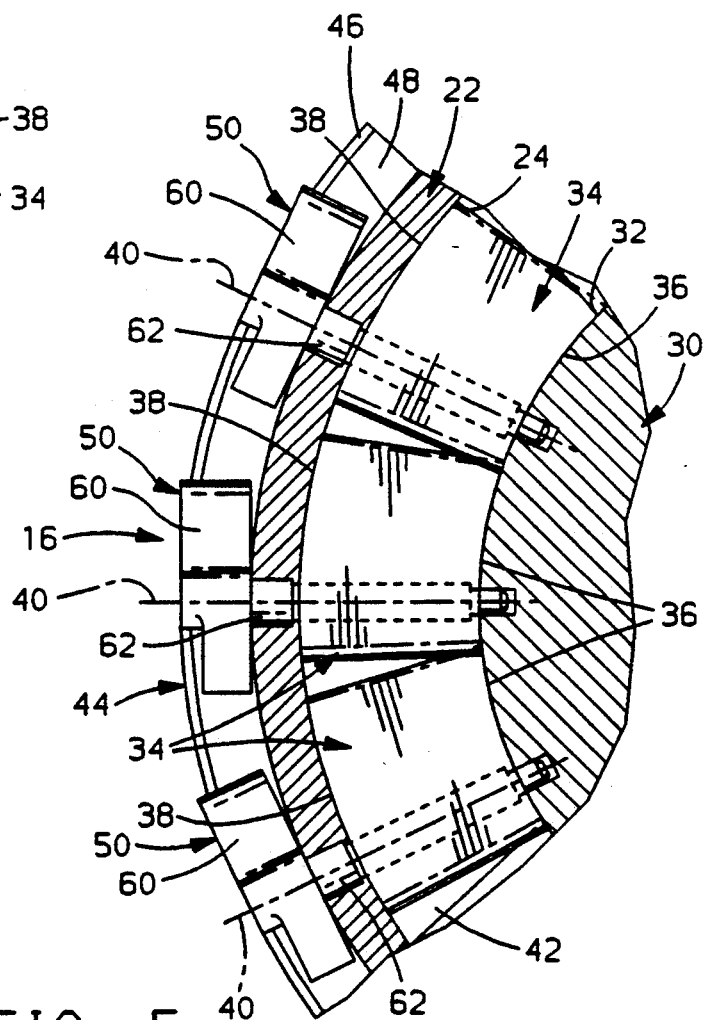
FIG. 5 shows a stator in the closed position in the direction of Arrows 3 of FIG. 1.

The stator 16 has fourteen stator blades 34 distributed around the torque converter axis 28 between the core surface 24 and the shell surface 32. The blades 34 each have a concave spherical edge surface 36 and a convex spherical edge surface 38 proximate to and complementary to the shell surface 32 and the core surface 24 respectively. Each blade 34 also has an axis of rotation 40 passing through the center 26 of the stator shell 30 and core 22. The blades 34 are rotatable between an open position, shown in FIG. 2 and FIG. 3, and a closed position, shown in FIG. 4 and FIG. 5.

In the closed position, the blades 34 block approximately 75% to 90% of an annular flow area 42 between the core 22 and the shell 30. The blades 34 also have a closed position inlet angle A, shown in FIG. 4, between the torque converter axis 28 and a line 43 from the axis of rotation 40 of the blades 34 through the tip of the blade 34. In the preferred embodiment, the angle A equals 64 degrees. The closed position inlet angle A is sufficiently large to diminish the flow of fluid from the turbine 14 to the impeller 12, thereby reducing torque converter transmitting capacity with the blades 34 in the closed position approximately 50% when compared with the torque transmitting capacity of the torque converter 10 when the stator blades 34 are in the open position. The difference in the torque transmitting capacity is shown in the plots in FIG. 6.

Figure 2:
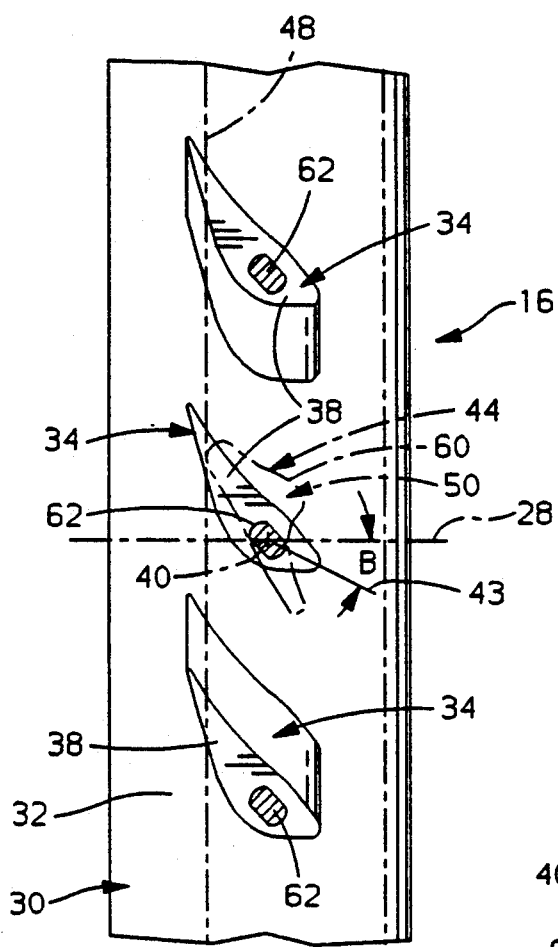
FIG. 2 shows a stator in the open position in the direction of Arrows 2 of FIG. 1.

An open position inlet angle B of the blades 34, corresponding to the closed position inlet angle A, is shown in FIG. 2.

The torque transmitting capacity reduction results in low creep torque. The combination of using the inlet angle A and blocking of the flow area between the core 22 and the shell 30 being limited to 75% to 90%, results in appreciably less driveline noise and vibration when compared with a conventional variable pitch stator.

The rotation of the stator blades 34 is controlled by a rotary control assembly 44 which establishes the angular disposition of the stator blades 34 between the open and the closed positions. The rotary control assembly 44 includes an annular piston cylinder 46 integral with the stator core 22, an annular piston 48 axially aligned with the piston cylinder 46, a plurality of stator pivots 50—one for each stator blade 34, and a plurality of piston springs 58 disposed between the piston cylinder 46 and the piston 48. The rotary control assembly 44 biases the blades 34 toward the closed position. Fluid impinging on the stator blades 34 must overcome the bias to rotate the blades 34 to the open position.

The rotary control assembly 44 is largely disposed in a core void 52. The core void 52 is bounded by an impeller core 54, a turbine core 56 and the stator core 22. The piston cylinder 46 is principally disposed in the core void 52 as is the annular piston 48. The stator pivots 50 are rotatively fixed to the corresponding blades 34. The pivots 50 have a cam portion 60 and a shaft portion 62 which passes through the stator core 22, the blades 34 and the stator shell 30. The stator pivots 50 are rotatively supported by the stator core 22 and the stator shell 30. The cam portion 60 is disposed in the core void 52 contiguous with the annular piston 48.

The piston springs 58 between the piston cylinder 46 and the piston 48 press the piston 48 into contact with the pivot cam portions 60. The blades 34 are thus biased to the closed position. The stator blades 34 are rotated to the open position by fluid flow past the blades 34. The piston 48 is displaced by the cam portions 60 of the stator pivots 50 toward the piston cylinder 46.

A pair of double labyrinth seals or restrictions 64 impede fluid from moving into and out of the core void 52. One double labyrinth seal 64 is located between the turbine core 56 and the stator core 22. The other double labyrinth seal 64 is located between the stator core 22 and the impeller core 54. The double labyrinth seals 64 minimize fluid flow through the core void 52 to reduce fluid drag in the core void 52.

An alternative configuration of the variable pitch stator 16 has eighteen stator blades 34 with the closed position inlet angle A equaling 30 degrees. Other stator configurations with the number of blades 34 being between fourteen and eighteen are possible. The closed position inlet angle A for a particular stator will vary inversely with the number of stator blades 34, from approximately 30 degrees to 70 degrees.

As the engine speed is increased from idle, the force of the fluid impinging on the stator blades 34 also increases. The force on the blades 34 is transferred to the cam portions 60 through the shaft portions 62. The cam portions 60 press against the piston 48, displacing the piston 48 into the piston cylinder 46, thereby compressing the springs 58. As the piston 48 moves further into the cylinder 46, the blades 34 are able to rotate further toward the open position.

Figure 6:
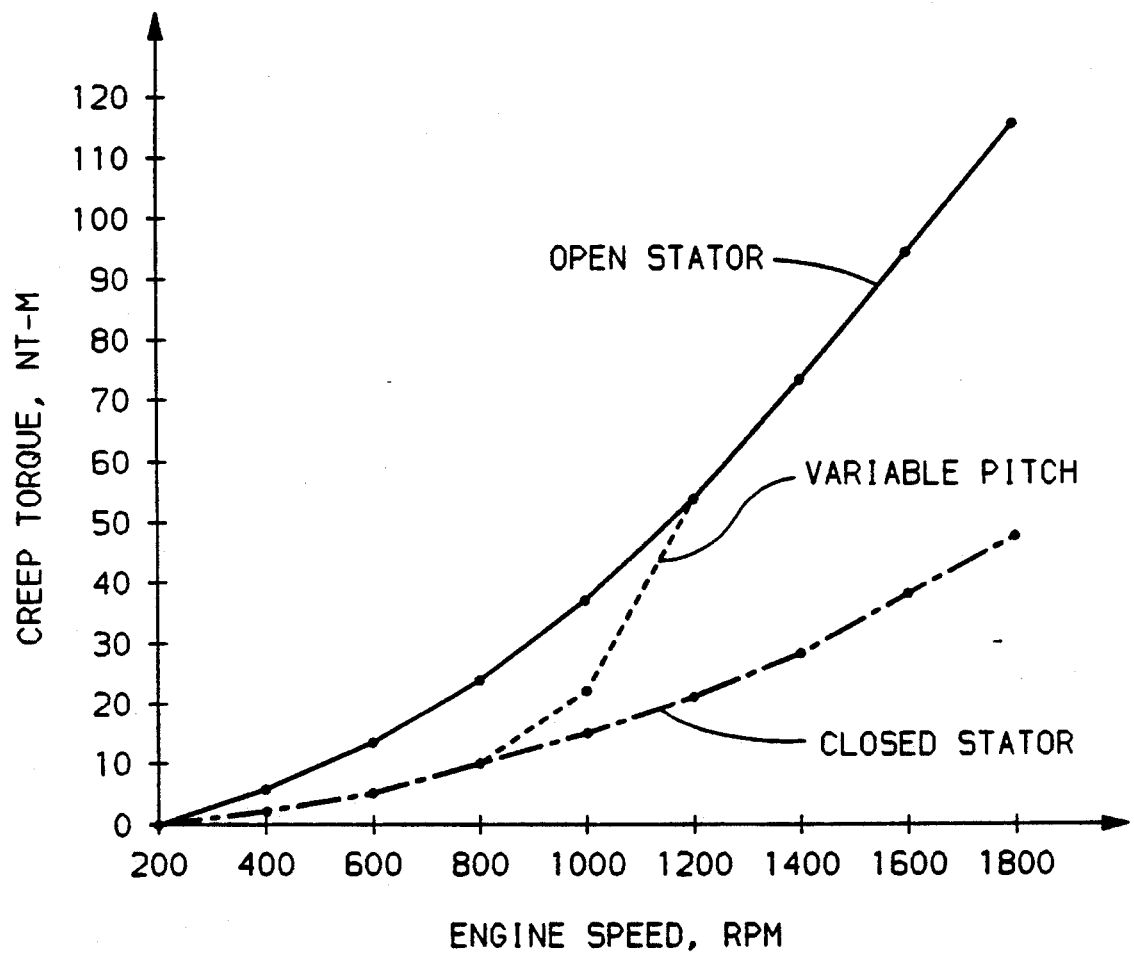
FIG. 6 shows a plot of creep torque as a function of engine speed.

The effect on creep torque of the transition in blade position from closed to open is illustrated in FIG. 6. Torque is shown as a function of the rotative speed of the engine crankshaft to which the impeller 12 is rotatively locked. The turbine 14 is stalled. The torque level with the stator blades 34 locked in the closed position is less than half the torque levels with the stator blades 34 locked in the open position. The stator blades 34, when not locked, make the transition from the closed to the open position between 800 and 1200 rpm.

As with a conventional fixed blade stator, the variable pitch stator 16 is rotatively fixed to the stationary shaft 20 when the rotative speed of the impeller 12 is significantly greater than that of the turbine 14. This is the case when the turbine 14 is stalled. Fluid exiting the turbine 14 impinges on the stator blades 34 at an angle resulting in a rotative force being applied to the stator 16 in the first direction opposite the direction of rotation of the impeller 12, thereby rotatively fixing the stator 16 to the stationary shaft 20. When the turbine 14 is allowed to rotate, its rotative speed approaches that of the impeller 12. The direction of fluid exiting the turbine 14 is shifted to produce a rotative force on the stator 16 in the second direction, the direction of rotation of the impeller 12 and turbine 14, thereby rotating the stator 16 relative to the stationary shaft 20 in the second direction.

A torque converter clutch 66 rotatively couples and uncouples the impeller 12 and the turbine 14. An increased harshness of clutch coupling and uncoupling has been perceived with previous variable pitch stators. The present invention is effective at minimizing any such harshness.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A three element fluid torque converter, being disposed between an engine and a transmission, comprising:
   a bladed impeller, being rotatively fixed to the engine;
   a bladed turbine, being rotatively fixed to a transmission input element;
   a stator, being rotatively fixed to a stationary shaft when subjected to torque in a first direction, rotating freely about the stationary shaft when subjected to torque in a second direction, being disposed in a flow path from the turbine to the impeller, the stator comprising:
      a stator core, having a core surface, the core surface having a center disposed on a torque converter axis;
      a stator shell, having a shell surface, radially disposed within the core surface, the shell surface having a center aligned with the core surface center;
      a plurality of stator blades, being distributed around the torque converter axis between the core surface and the shell surface, the blades having a first surface proximate to and complementary to the shell surface, the blades having a second surface proximate to and complementary to the core surface, the blades having an axis of rotation passing through the stator shell and core, the blades being rotatable between an open position and a closed position, the blades in the closed position blocking approximately 75% to 90% of an annular area between the shell and the core, the blades having a closed position inlet angle between the torque converter axis and a line from the center of rotation of the blade to a tip of the blade, the closed position inlet angle being between approximately 30 degrees and 70 degrees, the closed position inlet angle for a particular stator varying inversely with the number of stator blades, the closed position inlet angle selected being sufficiently large to diminish a flow of fluid from the turbine to the impeller, thereby reducing torque converter torque transmitting capacity in the closed position by approximately 50% over the torque transmitting capacity of the torque converter with the blades in the open position; and
      means for rotating the stator blades between the open position and the closed position, biasing the blades toward the closed position, with fluid impinging on the stator blades overcoming the bias, thereby rotating the blades to the open position.

2. A three element fluid torque converter as claimed in claim 1, further comprising:
   the stator having 14 blades with the closed position stator inlet blade angle being approximately 64 degrees.

3. A three element fluid torque converter as claimed in claim 1, further comprising:
   the stator having 18 blades with the closed position stator inlet blade angle being approximately 30 degrees.

4. A three element fluid torque converter as claimed in claim 1, further comprising:
   one double labyrinth seal between a turbine core and the stator core; and
   a second double labyrinth seal between a stator core and an impeller core, the seals restricting the movement of fluid into a core void bounded by the impeller core, the stator core, and the turbine core.

5. A three element fluid torque converter as claimed in claim 1, the means for rotating the stator blades having:
   an annular piston cylinder, integral with the stator core, principally disposed in a core void, the core void bounded by an impeller core, a turbine core, and the stator core;
   an annular piston, axially aligned with the piston cylinder, being disposed in the core void;
   a plurality of stator pivots, each associated with one of the blades, the pivots rotatively fixed to their respective blades, the stator pivots having a cam portion and a shaft portion, the shaft portion passing through the stator core, the blade, and the stator shell, the stator pivot being rotatably supported by the stator core and the stator shell, the cam portion disposed in the core void proximate to the annular piston outside the stator shell; and
   piston springs, being disposed between the piston cylinder and the piston, pressing the piston into contact with the stator pivot cam portions, biasing the blades to the closed position, the springs being overcome by the stator pivots when the stator blades are rotated by fluid flow past the blades.

6. A three element fluid torque converter as claimed in claim 5, further comprising:
   one double labyrinth seal between the turbine core and the stator core; and
   a second double labyrinth seal between a stator core and the impeller core, the seals restricting the movement of fluid into the core void.

7. A three element fluid torque converter, being disposed between an engine and a transmission, comprising:
   a bladed impeller, being rotatively fixed to the engine;
   a bladed turbine, being rotatively fixed to a transmission input element; and
   a stator, being rotatively fixed to a stationary shaft when subjected to torque in a first direction, rotating freely about the stationary shaft when subjected to torque in a second direction, being disposed in a flow path from the turbine to the impeller, the stator comprising:
      a stator core, having a concave spherical core surface, the core surface having a center disposed on a torque converter axis;

a stator shell, having a convex spherical shell surface, radially disposed within the core surface, the shell surface having a center common with the core surface center;

a plurality of stator blades, being distributed around the torque converter axis between the core surface and the shell surface, the blades typically having a concave spherical edge surface proximate to and complementary to the shell surface, the blades having a convex spherical edge surface proximate to and complementary to the core surface, the blades having an axis of rotation passing through the center of the stator shell and core, the blades being rotatable between an open position and a closed position, the blades in the closed position blocking approximately 75% to 90% of an annular area between the shell and the core, the blades having a closed position inlet angle between the torque converter axis and a line from the center of rotation of the blade to a tip of the blade, the closed position inlet angle being between 30 degrees and 70 degrees, the closed position inlet angle for a particular stator varying inversely with the number of stator blades, the closed position inlet angle selected being sufficiently large to diminish a flow of fluid from the turbine to the impeller, thereby reducing torque converter torque transmitting capacity in the closed position by approximately 50% over the torque transmitting capacity of the torque converter with the blades in the open position, consequently producing low creep torque, while producing appreciably less driveline noise and vibration than a stator with rotatable vanes blocking near 100% of the annular area between the shell and the core in the closed position; and means for rotating the stator blades between the open position and the closed position, biasing the blades toward the closed position, with fluid exiting the turbine overcoming the bias, thereby rotating the blades to the open position.

8. A three element fluid torque converter as claimed in claim 7, further comprising:

the stator having 14 blades and the closed position stator inlet blade angle being approximately 64 degrees.

9. A three element fluid torque converter as claimed in claim 7, further comprising:

the stator having 18 blades and the closed position stator inlet blade angle being approximately 30 degrees.

10. A three element fluid torque converter as claimed in claim 7, further comprising:

one double labyrinth seal between a turbine core and the stator core; and a second double labyrinth seal between a stator core and an impeller core, the seals restricting the movement of fluid into a core void bounded by the impeller core, the stator core, and the turbine core.

11. A three element fluid torque converter as claimed in claim 7, the means for rotating the stator blades having:

an annular piston cylinder, integral with the stator core, principally disposed in a core void, the core void bounded by an impeller core, a turbine core, and the stator core;

an annular piston, axially aligned with the piston cylinder, being disposed in the core void;

a plurality of stator pivots, each associated with one of the blades, the pivots rotatively fixed to their respective blades, the stator pivots having a cam portion and a shaft portion, the shaft portion passing through the stator core, the blade, and the stator shell, the stator pivot being rotatably supported by the stator core and the stator shell, the cam portion disposed in the core void proximate to the annular piston outside the stator shell; and piston springs, being disposed between the piston cylinder and the piston, pressing the piston into contact with the stator pivot cam portions, biasing the blades to the closed position, the springs being overcome by the stator pivots when the stator blades are rotated by fluid flow past the blades.

12. A fluid torque converter as claimed in claim 11, further comprising:

one double labyrinth seal between the turbine core and the stator core; and a second double labyrinth seal between the stator core and the impeller core, the seals restricting the movement of fluid into the core void.

* * * * *